Patented July 5, 1932

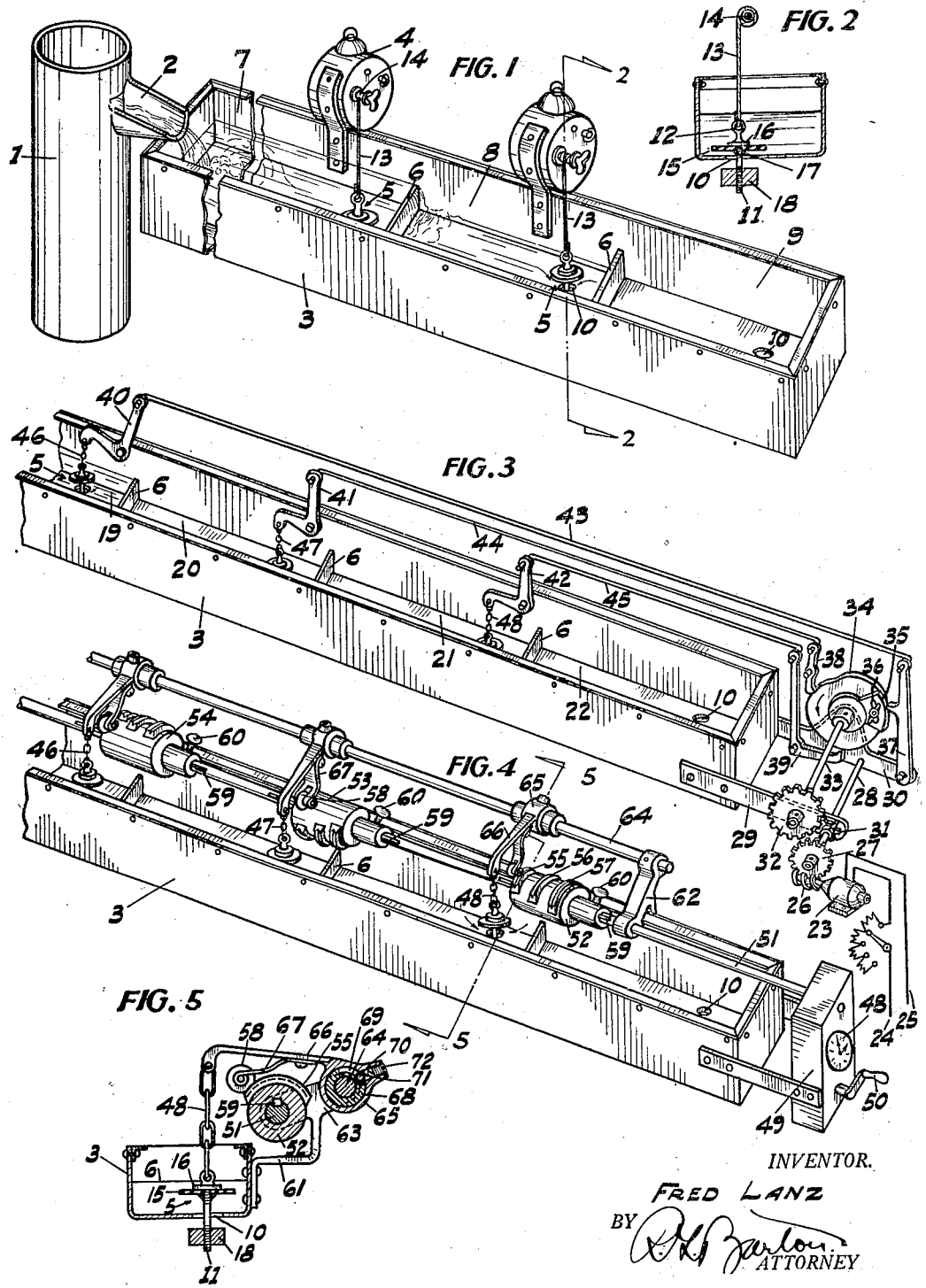

1,865,769

UNITED STATES PATENT OFFICE

FRED LANZ, OF BOREGO, CALIFORNIA

AUTOMATIC WATER CONTROL

Application filed February 24, 1931. Serial No. 517,941.

My invention relates to improved means in devices for automatically controlling and regulating the quantity and flow of water specially allotted for irrigation purposes in arid soil, and it is one of the important objects of this invention to provide accurate and dependable means for distributing to certain specified areas water for irrigation purposes, the quantity of water needed having been first ascertained from the texture of the land and the plant grown, whereby to prevent sunscald in the daytime and plant rot or waterkilling at night-time.

Another important object of the invention is the incorporaton of means for varying the irrigating supply by an adjustment of a time-regulated means so as to distribute to or over certain areas sequential flows, that consume equal or unequal allotments of time at predetermined periods, the summation of which consume the entire day period or night period or a full twenty-four-hour period, thus aiding to maintain fertility and productivity of the soil.

Another important object of the invention is to provide means whereby the cycle of irrigation is coordinated with the cycle of time in recurring or successive order, thereby contributing to the maximum amount of water conservation and establishing intermittent practice so essential in irrigation.

Other features of my invention may hereinafter appear as the disclosure follows.

In the drawing, which forms a complementary part of the specification, is shown three principal analogies of the invention, the descriptive sense alluding to one being generic to that of the others, and the invention is to be so interpreted.

In the drawing:

Fig. 1 is a perspective view of an automatic time controlling mechanism constructed to conform to the principles of my invention.

Fig. 2 is a cross-section taken on line 2—2 of Fig. 1 in the direction indicated by the arrows.

Fig. 3 is a perspective view of an automatic controlling mechanism constructed subordinately but generically according to the principles of my invention.

Fig. 4 is still another interpretation of an automatic time-controlling mechanism constructed in accordance with the generic idea of my invention; and Fig. 5 is a cross-section taken on line 5—5 of Fig. 4 in the direction indicated by the arrows.

Referring now to the drawing, Figs. 1, 3 and 4 will first be generally referred to and discussed.

In Fig. 1 is shown an irrigation stand pipe, or liquid head 1, having a spout 2, adapted to conduct liquid from the stand pipe 1 into a conduit or flume 3, said stand pipe is not shown in either of Figs. 3 and 4, yet it is to be understood such a source of supply is provided in conjunction therewith.

The flume 3 is adapted for use in either of the species shown in the several views.

In Fig. 1, I show an automatic-time-controlling mechanism 4 for operating a valve 5. Such a time-controlling mechanism is shown in detail in Fig. 3 and symbolically alluded to in Fig. 4.

Since the time-controlling element is not considered a part of the invention per se, it is not considered essential for instance in Figs. 1 and 4, to enter into detail with this construction, as it is well known in the art. Such a clock-work mechanism as is ordinarily used in an alarm clock, and featured in Fig. 1, may in itself be adequate to operate a valve such as is shown in that figure and it can preferably be made stronger than usual in order to effect positive action if the case needs be.

Therefore, it is considered unnecessary to describe more in detail the time-operating mechanism other than that specifically shown in Fig. 2, and alluding in general to the well known form of clock in Fig. 1, or the symbol of time clock in Fig. 4, now set forth in the complete disclosure following.

The invention which forms the subject matter of the following disclosure relates to improved means primarily designed for irrigation purposes, and used especially in arid lands where the source of supply is usually limited and conservation must be practiced, and the following description of the nature and manner in which the same is to be performed will be set forth in relation to that specific purpose, although the same is not to be misconstrued as unadaptive to other uses and purposes as well.

The flume 3 may be constructed of any durable material such as wood or sheet metal, sheet metal such as a light-gauge galvanized iron, being considered preferable in the present instance on account of its lightness and durability. Within the flume are desirably positioned a plurality of dissepiments or weirs 6, sub-dividing the flume into a number of compartments 7, 8 and 9, which are adapted to feed certain areas of land to be irrigated.

In the wall of each of said compartments is an orifice 10, and there is a valve 5 to automatically open and close said orifice at any predetermined period of time. This orifice may communicate with a furrow or a pipe or any means for conveying the water either to a sub-jacent area or a distant area. The same is constructed for sub-soil irrigation in the daytime or surface irrigation at night time, it having been previously determined just the amount of water needed for that particular area, then setting the timing mechanism so as to automatically shut off the irrigation to that area and open up another area to be irrigated in successive and consecutive order.

In such a manner the entire day could be apportioned to allotting to certain specified areas the exact quantity of water necessary for that area, and which will foster growth of the plant and engender conservation of the water. Therefore, at night time which is usually considered a desirable time for irrigation, the valves may be set and timed that the comfort of the agriculturist will be undisturbed for any inspection which might otherwise be necessary to prevent endangering his crop.

The valve 5 comprises a valve stem 11, one end of which is provided with an eye 12 for the insertion of a flexible connection 13, said connection being wound about the spindle 14 of an ordinary alarm clock 4. At any predetermined period the clock may operate the spindle so as to unwind the connection for the purpose sought. There is mounted on the valve stem 11 a gasket 15 secured against a flange 16 by a nut 17 for the purpose of closing the orifice 10 as the spindle rotates to unwind the connection 13 at a time when it is considered necessary to shut off the irrigation to a particular area.

There is secured to the valve stem 11 a counterweight 18, whereby the gasket will be retained in close fitting relation to the wall of the flume. The gasket is made sufficiently large in diameter to always close the orifice no matter what the position of the valve stem might be. When the valve 5 in compartment 7 is closed, water from the compartment 7 spills over the weir 6 into compartment 8.

At such time as the area irrigated from that compartment is completed, its valve is set to be operated at the conclusion of that period, and then the water is permitted to flow in the flume through compartments 7 and 8 into compartment 9 and water will continue to flow through its orifice until the water is shut off, since no valve is shown in connection therewith, or such time that the valves in compartments 7 or 8 are opened. The clocks 4 are mounted to the flume in any desired manner so that the valves will be suspended vertically below the spindle to which they are mounted.

With such an arrangement as just described, the operator sets his clocks to function the valves at whatever time is deemed advisable.

In order to have a recurring series of periodic irrigation to respective areas with the apparatus just described, it is always necessary for the operator to set his clocks in advance and reset them for successive recurring operations.

Therefore, in order to accommodate a recurring sequential operation of irrigation throughout the entire day and have the same uninterruptedly repeated, I provide apparatus such as illustrated in Fig. 3, and Figs. 4 and 5. In said figures the device could be started with all the valves closed and then they could be successively opened beginning at the lower end of the conduit. In this manner some of the wiers could be dispensed with.

In said apparatus is incorporated means whereby certain recurring periods of time may also be fluctuated to the convenience of the operator in giving to certain areas more or less water for irrigation depending on the porosity and texture of the soil and the amount necessary for plant life.

By referring to Fig. 3, it will be noted I adopt the use of a similarly constructed flume with its similarly constructed weirs, orifices and valves to that illustrated in Fig. 1. In Fig. 3 however, it will be noted there is an extra compartment. The compartments of this flume are designated by the numerals 19, 20, 21 and 22.

For the purpose of outlining the functioning of the apparatus in Fig. 3, let it be assumed there are four areas to be treated, each to be irrigated for a period of six hours each or multiples thereof.

The time-controlling mechanism which is deemed most expeditious for operating the respective valve in the present instance, comprises a motor 23 rheostatically operated through a source of current provided by leads 24 and 25.

There is a train of gearing including a worm 26 meshing with a worm gear 27. The worm gear 27 is cantileverally mounted on a shaft 28 which is journalled in brackets 29 and 30 each of which are fastened to the sides of the flume 3.

To the shaft 28 is also mounted a pinion 31, and a pinion gear 32 meshes with said pinion whereby the latter gear receives its motion. Gear 32 is mounted on a shaft 33 also journalled in brackets 29 and 30. To the shaft 33 is also mounted a cam 34 carrying an adjustable cam face extension 35, whereby the interval of time may be varied for the operation of the respective valves in the flume.

The cam face extension 35 is bolted to the cam 34 proper, and the extension is provided with an arc slot 36 for the purpose of providing for its angular adjustment.

Operating on the face of the cam are a plurality of pivoted levers, 37, 38 and 39. Each of said levers are connected to its respective bell-crank lever 40, 41 and 42 by connecting rods 43, 44 and 45, whereby through the medium of chains 46, 47 and 48 connecting with the valves and their respective bell-crank levers, said valves may be operated through the interruption of the levers 37, 38 and 39 on the eccentrically formed face of the cam with which they are successively and consecutively timed to operate.

The bell-crank levers are each pivotally mounted to the flume in such a manner that the valves will suspend vertically therefrom. They operate in a plane coincident with that of the levers which operate on the cam. As stated supra on account of the broken away portion of the flume, the water head does not appear in Figs. 3 and 4.

In order to provide for still greater adjustment of time for period operation of the valves, I shall now disclose such an apparatus with specific reference to Figs. 4 and 5.

In Fig. 4 is shown a similarly constructed flume to that in Fig. 3, with its similar constructed weirs, orifices, and valves. The time-controlling apparatus indicative from the time symbol 48 on the casing 49 containing the apparatus, may be typical of that illustrated in Fig. 3 or any kindred mechanism, but in view of the crank 50 let it be assumed to be a clock arranged mechanism suitable to drive the rotation of the shaft 51.

Onto the shaft 51 is mounted a plurality of drums 52, 53 and 54. These drums are each provided with different length V-groove cam faces 55, 56 and 57 in which a roller 58 is adapted to travel. Its operation in conjunction with the cam automatically opens and closes the valves. Said drums are each slidably adjustable lengthwise the shaft 51 on a key 59 and retained in selective position by a thumb screw 60.

There is a bearing bracket 61 fastened to the wall of the flume, one arm 62 which supports the shaft 51. There is another arm 63 which bracketally supports the counter-shaft 64, and on said shaft 64 is mounted a bracket 65 the cantilever arm 66 of which is adapted to open and close the valve 5 through the medium of the roller 58 operating in the V-groove of the cam aforesaid, and the chain 48 connecting with the valve. The roller 58 is rotatively carried by a spring support bracket 67 fastened to the arm 66.

In order to provide for quick opening and closing of the valve 5 the roller 58 is abruptly elevated on the cam face and similarly unseated therefrom by the means now to be described.

The bearing 65 is mounted to travel about a sleeve 68 shrunk on the shaft 64. In the periphery of the sleeve 68 is a segmental ball-race 69 preferably limited to the travel of the uplift of the valve 5.

In said race travels a ball 70, and at each end of the race is a ball seat in which the ball 70 is seated. The ball is constrained to travel in the race under the influence of a spring 71, the tension of which may be adjusted to suit the valve opening and closing conditions by screwing a set screw 72 thereagainst.

As the roller 58 creeps up into the V-groove of the cam, its spring connection 67 will cause an abrupt tripping of the arm 66 through the agency of the means just described and the arrangement taught by the Fig. 5 of the drawing thereby giving to the valve a positive quick opening and closing action.

From the foregoing it is considered that the operation of the device will be clearly understood.

Claims.

1. A flume having a series of cross pieces inserted in the bottom portion thereof at intervals to form weirs, there being a bottom outlet in the flume for each of said weirs, valves to control said outlets, an operating connection for each of said valves, means to mount said connections above the flume extending lengthwise thereof, and a common operating means for said connections adapted to exert traction upon them lengthwise of the flume to operate said valves.

2. A flume having a series of spaced outlets therealong, a valve to control each of said outlets, an operating connection for each of said valves, said connections all extending lengthwise of the flume and being operatively connected at one end thereof with a common operating means, said operating means consisting of a cam disc, and the operating connection between said cam disc and each of said valve operating connections consisting of a lever and means to yieldingly hold a portion of each of said levers in an operative engagement with different circumferential portions of said cam disc.

3. A flume having a series of spaced bottom outlets therealong, a valve to control each of said outlets, a bell crank lever mounted upon the flume above each of said valves and having a laterally extending arm connected with said valve to operate the same, an operating rod connected with the other arm of each of said bell crank levers, each of said rods extending lengthwise of the flume and operatively connected at its other end with an operating means common to one of said rods, said operating means consisting of a cam disc, and each of said operating rods being operatively connected with said cam disc by means of a lever each of said levers engaging operatively with different parts of the periphery of said cam disc.

FRED LANZ.